(12) United States Patent
Gupta et al.

(10) Patent No.: US 12,181,973 B2
(45) Date of Patent: Dec. 31, 2024

(54) UPDATING FIRMWARE BASED ON FIRMWARE STABILITY INDEX

(71) Applicant: American Megatrends International, LLC, Duluth, GA (US)

(72) Inventors: Chitrak Gupta, Kolkata (IN); Venkatesan Balakrishnan, Chennai (IN); Anurag Bhatia, Sugar Hill, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 130 days.

(21) Appl. No.: 17/981,831

(22) Filed: Nov. 7, 2022

(65) Prior Publication Data

US 2024/0152428 A1 May 9, 2024

(51) Int. Cl.
*G06F 11/14* (2006.01)
*G06F 8/65* (2018.01)

(52) U.S. Cl.
CPC ............ *G06F 11/1433* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 7,831,412 | B1* | 11/2010 | Sobel | G06F 11/3476 702/179 |
| 7,966,278 | B1* | 6/2011 | Satish | G06F 8/61 717/124 |
| 8,219,983 | B1* | 7/2012 | Sobel | G06F 8/60 717/126 |
| 8,255,902 | B1* | 8/2012 | Satish | G06F 8/61 717/174 |
| 2003/0233648 | A1* | 12/2003 | Earl | G06F 8/65 717/176 |
| 2005/0210461 | A1* | 9/2005 | Srivastava | G06F 8/65 717/170 |
| 2018/0165085 | A1* | 6/2018 | Carter | G06F 8/60 |
| 2020/0034133 | A1* | 1/2020 | Dattatri | G06F 8/65 |
| 2020/0218527 | A1* | 7/2020 | Ganesan | G06F 8/65 |
| 2021/0141626 | A1* | 5/2021 | Ladkani | G06F 3/0676 |
| 2021/0357315 | A1* | 11/2021 | Padubidri | G06F 8/60 |
| 2022/0197770 | A1* | 6/2022 | Tan | G06F 8/65 |

* cited by examiner

*Primary Examiner* — Qing Chen
(74) *Attorney, Agent, or Firm* — LOCKE LORD LLP; Tim Tingkang Xia, Esq.

(57) ABSTRACT

In an aspect of the disclosure, a method, a computer-readable medium, and a BMC are provided. The BMC receives an update package containing one or more updated software components of a firmware image of the BMC to replace corresponding existing software components running on the BMC. The BMC shuts down the existing software components and executes the one or more updated software components. The BMC calculates one or more first stability factors of the one or more updated software components. The BMC compares the one or more first stability factors with one or more second stability factors of the corresponding existing software components. The BMC determines whether to keep the updated software components based on a comparison result.

18 Claims, 7 Drawing Sheets

UPDATING FIRMWARE BASED ON FIRMWARE STABILITY INDEX

BACKGROUND

Field

The present disclosure relates generally to computer systems, and more particularly, to techniques of service driven firmware upgrade in baseboard management controller (BMC) based on a firmware stability index.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Not all host systems have the hardware capability for service processors to access storages of component devices (e.g., a Serial Peripheral Interface (SPI) storages) directly or communicate with the component devices. Therefore, there is a need for a mechanism for updating firmware of the component devices conveniently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a BMC are provided. The BMC receives an update package containing one or more updated software components of a firmware image of the BMC to replace corresponding existing software components running on the BMC. The BMC shuts down the existing software components and executes the one or more updated software components. The BMC calculates one or more first stability factors of the one or more updated software components. The BMC compares the one or more first stability factors with one or more second stability factors of the corresponding existing software components. The BMC determines whether to keep the updated software components based on a comparison result.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
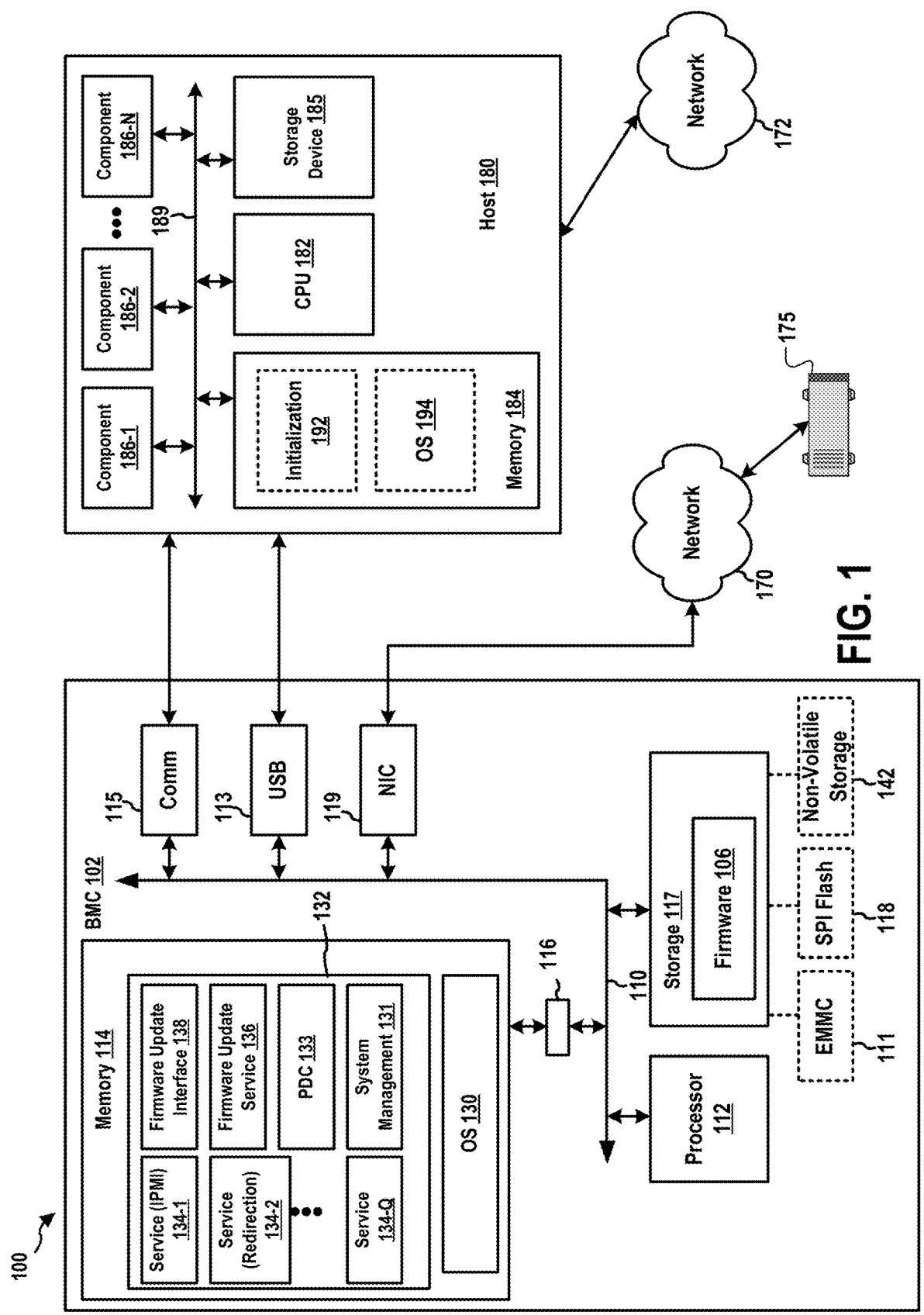
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a network interface card 119, a USB interface 113 (Universal Serial Bus), and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware image 106 in the storage 117. The storage 117 may utilize a non-volatile, non-transitory storage media. The storage 117 may also include an embedded multimedia card (EMMC) 111, an SPI flash device 118, and/or a non-volatile storage 142, all of which may be used to store the BMC firmware image 106. When the processing unit 112 executes the BMC firmware image 106, the processing unit 112 loads code and data of the BMC firmware image 106 into the memory 114. In particular, the BMC firmware image 106 can provide in the memory 114 an operating system (OS) 130 and service components 132. The service components 132 include, among other components, services 134-1 to 134-Q, a system management component 131, a process data collector (PDC) 133, a firmware installation service 136 and a firmware installation interface 138. For example, the service 134-1 may be an intelligent platform management interface (IPMI) service. The service 134-2 may be a media redirection service. Further, the service components 132 may be implemented as a service stack. As such, the BMC firmware image 106 can provide an embedded system to the BMC 102.

The BMC 102 may be in communication with the host computer 180 through the USB interface 113, the network interface card 119, the communication interfaces 115, and/or the IPMI interface.

The host computer 180 includes a host CPU 182, a host memory 184, a storage device 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 702 shown in FIG. 7.

After the host computer 180 is powered on, the host CPU 182 loads an initialization component 192 from the storage device 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

As described supra, a BMC (e.g., the BMC 102) may runs as an SOC with its own firmware (e.g., the BMC firmware image 106). The firmware may include a complete operating system (e.g., embedded Linux) and a set of applications that provide management functions. A BMC over its lifetime undergoes multiple firmware updates that adds features or provides fixes to issues. Firmware updates of the BMC may lead to flashing of a version that creates more instability in the system. Such instabilities may discourage many customers to have frequent firmware updates. Firmware updates may be planned only at certain intervals and will be done only when required features or fixes are provided. To improve firmware updates feasibility, a stability index for the updated firmware is provided to allow reverting back to older services with similar or higher stability index, thus protecting the existing stable components in a BMC from being overwritten by newer untested components.

Figure 2:
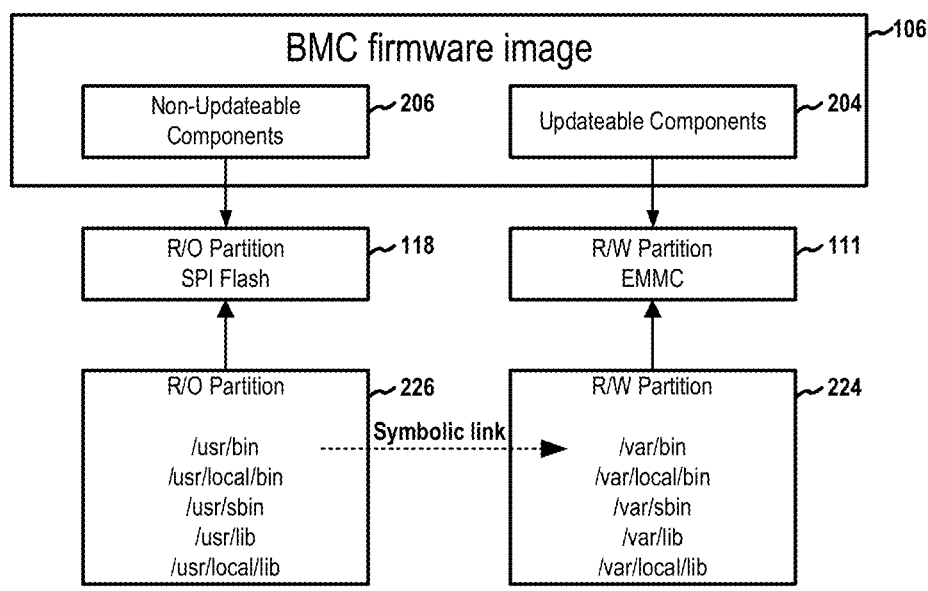
FIG. 2 is a diagram illustrating a first technique of service driven firmware upgrade.

FIG. 2 is a diagram 200 illustrating a first technique of service driven firmware upgrade. In particular, the components of the BMC firmware image 106 may be mounted on different filesystems. The BMC firmware image 106 may be segregated into updateable components 204 that need to be updated frequently (e.g., certain library files) and non-updateable components 206 that do not need to be updated frequently (e.g., certain immutable components).

When the BMC firmware image 106 is initially loaded to components of the storage 117 by an installation service, the installation service may install the updateable components 204 in a read/write (R/W) media such as the EMMC 111 and install the non-updateable components 206 in a read only (R/O) media such as the SPI flash device 118.

More specifically, installation packages containing the non-updateable components 206 are marked as non-updateable. Accordingly, the binary files from those installation packages are stored in the SPI flash device 118. Further, the SPI flash device 118 corresponds to a R/O partition 226 (e.g., /usr directory) of a file system created for the BMC 102. Accordingly, the non-updateable components 206 are stored in the /usr directory of the file system.

Installation packages containing the updateable components 204 are marked as updateable. For example, the updateable components 204 may include updated services 134-1', 134-2'. Accordingly, the binary files from those installation packages are stored in the EMMC 111. Further, the EMMC 111 corresponds to a R/W partition 224 (e.g., /var directory) of the file system created for the BMC 102. Accordingly, each of the updateable components 204 is stored in the /var directory of the file system. Further, a respective symbolic link for each component is created in the /usr directory of the R/O partition 226. When the BMC 102 boots and a loader of the BMC 102 attempts to load binaries stored in the /usr directory (i.e., the R/W partition 224), the loader may detect that the file stored in the /usr directory is a symbolic link pointing to a file stored in the \var directory (i.e., the R/O partition 226). Accordingly, the loader loads the corresponding file from the \var directory.

Figure 3:
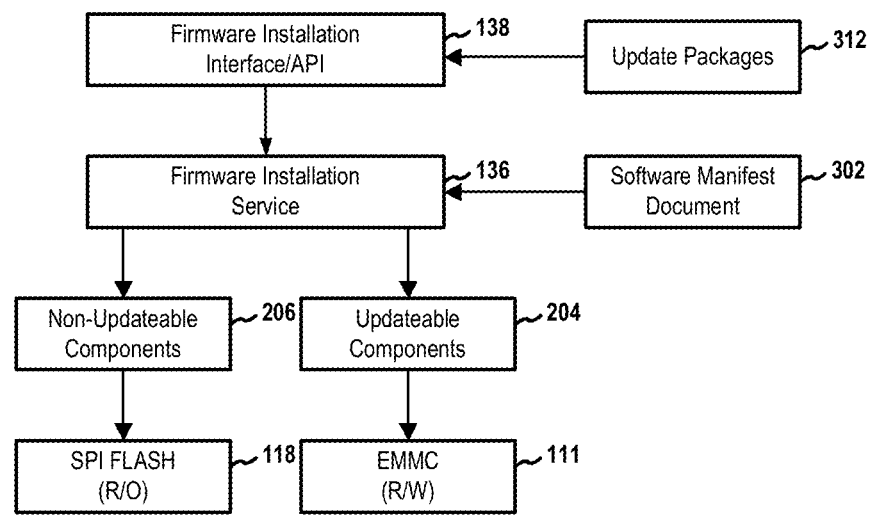
FIG. 3 is a diagram illustrating data flows of firmware updates in accordance with the first technique.

FIG. 3 is a diagram 300 illustrating data flows of firmware updates in accordance with the first technique. As described supra, the firmware installation interface 138 and the firmware installation service 136 run on the BMC 102. The firmware installation interface 138 may provide a REDFISH API or a web interface. The firmware installation interface 138 receives, e.g., from the remote device 175, firmware update packages 312 for an update of the BMC firmware image 106. The firmware installation interface 138 send the firmware update packages 312 to the firmware installation service 136. The firmware installation service 136 is configured with a software manifest 302 or the firmware update packages 312 contains a software manifest 302. The firmware installation service 136 checks the updateable flag in the software manifest 302 to determine the updateable components 204 and the non-updateable components 206 contained in the firmware update packages 312. At this time, the firmware installation service 136 only allows installation of the updateable components 204.

If a component of the updateable components 204 contained in the firmware update packages 312 already exists in the R/W partition 224, the firmware installation service 136 replaces the existing component with the updated one contained in the firmware update packages 312. If the component does not exist in the R/W partition 224, the firmware installation service 136 writes the component to the R/W partition 224 and creates a symbolic link in the R/O partition 226. In certain configurations, the firmware installation service 136 may discard the non-updateable components 206 contained in the firmware update packages 312.

As such, when the BMC 102 boots next time, the loader of the BMC 102 loads the updated components (as indicated by the symbolic links) from the R/W partition 224. As shown, with support from EMMC devices, the BMC 102 can host R/W partitions or the complete rootfs in the EMMC partition. The R/W partition can be standard ext linux file systems.

In this example, the BMC 102 loads the updated services 134-1', 134-2'. As such, the updated services 134-1', 134-2' are running on the BMC 102. As described infra with reference to FIG. 6, the PDC 133 determines the updated services 134-1', 134-2' are updated services and, accordingly, calculates stability factors and $y_{1,m+1}$ and $y_{2,m+1}$ for a $(m+1)^{th}$ time period after the updates are installed. Previously, the PDC 133 also calculated $y_{1,m}$ and $y_{2,m}$ for an $m^{th}$ time period prior to the update. The management component 131 may compare the current stability factor of each service with the prior stability factor of that service to determine whether the updated service is more stable. Alternatively, the PDC 133 may calculate a firmware total stability factor $Y_{m+1}$, which is then compared with the prior total stability factor $Y_m$ to determine whether the updated firmware is more stable as a whole.

When the updated firmware is less stable than the previous version, the management component 131 may decide to revert to the previous version. Accordingly, the management component 131 may remove the updated services 134-1', 134-2' and reinstall the initial services 134-1, 134-2. Subsequently, the firmware installation interface 138 may receive another firmware update packages including updated services 134-1*, 134-2*. Similarly, the firmware installation service 136 can create another upper layer 460* containing the updated services 134-1*, 134-2*. The BMC 102 reboots and runs the updated services 134-1*, 134-2*. The PDC 133 similarly calculates the stability factors of the two updated services in a $(m+2)^{th}$ time period after the second update.

In the example, the management component 131 determines that the updated services 134-1*, 134-2* are not less stable than the previous version. The management component 131 determines that the current version of the firmware may be used as baseline firmware.

Figure 4:
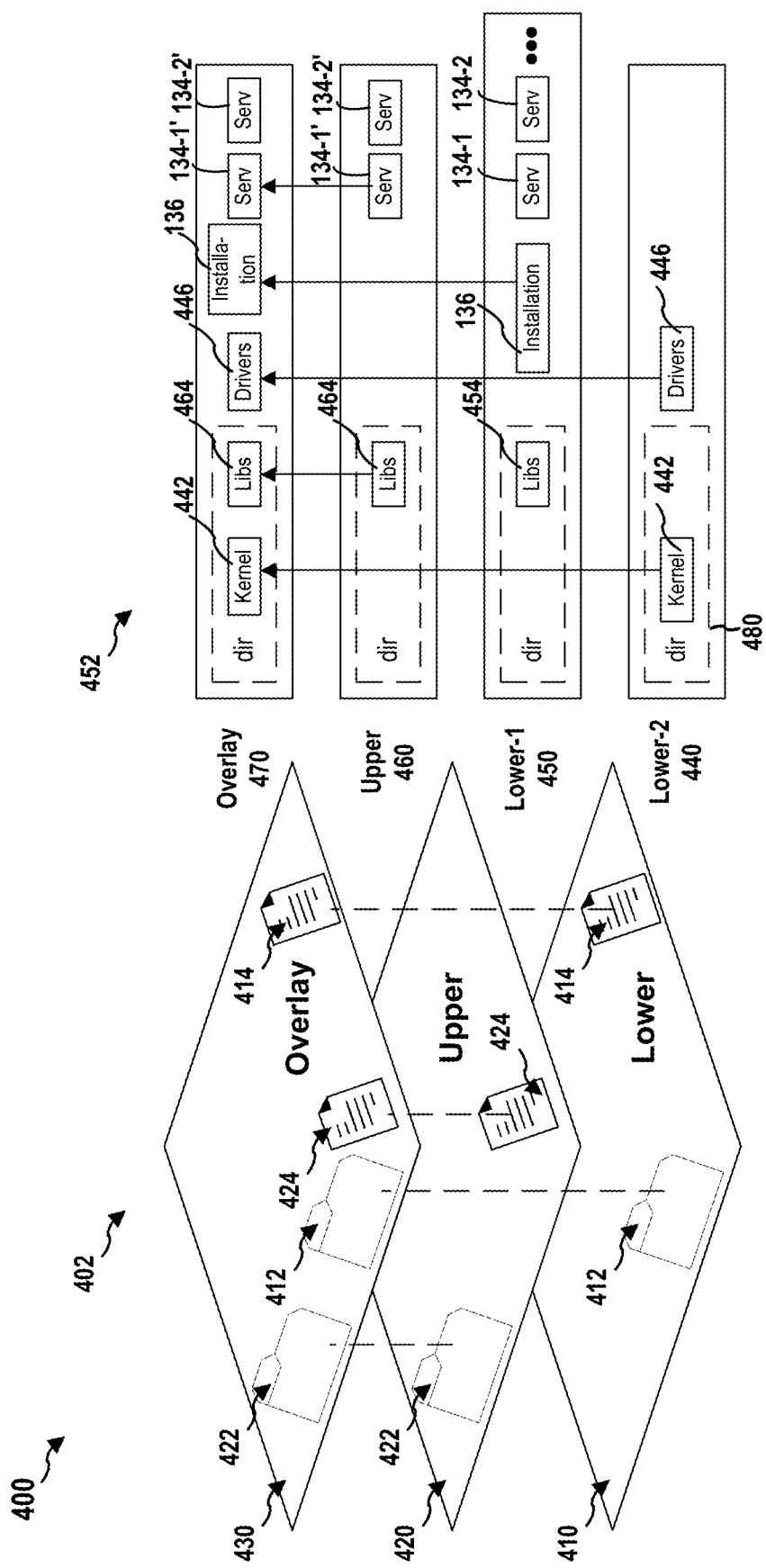
FIG. 4 is a diagram illustrating a second technique of service driven firmware upgrade.

FIG. 4 is a diagram 400 illustrating a second technique of service driven firmware upgrade. An overlay file system 402 contains two or more layers of directories and files and can generate an overlay layer that combines one or more layers together. In this example, the overlay file system 402 has a lower layer 410 and an upper layer 420. The lower layer 410 may include a directory 412 and a file 414. The upper layer 420 may include a directory 422 and a file 424. The overlay layer 430 combines the lower layer 410 and the upper layer 420 and has the directories 412, 422 and the files 414, 424.

In another example, the BMC firmware image 106 is initially installed on an overlay file system 452 having a lower-2 layer 440 and a lower-1 layer 450. In certain configurations, the lower-2 layer and the lower-1 layer 450 may be stored in a RIO partition such as the SPI flash device 118. In certain configurations, the lower-2 layer 440 and the lower-1 layer 450 may be stored in a R/W partition such as the non-volatile storage 142. The lower-2 layer 440 contains an initial kernel 442 in a directory 480 and initial drivers 446. The lower-1 layer 450 contains initial libraries 454 in the directory 480, the firmware installation service 136, and initial services 134-1, 134-2, etc. The overlay file system 452 combines the lower-1 layer 450 and the lower-2 layer 440 to generate an initial overlay layer. When the BMC 102 initially boots, the loader of the BMC 102 loads those components contained in the lower-2 layer 440 and the lower-1 layer 450.

Figure 5:
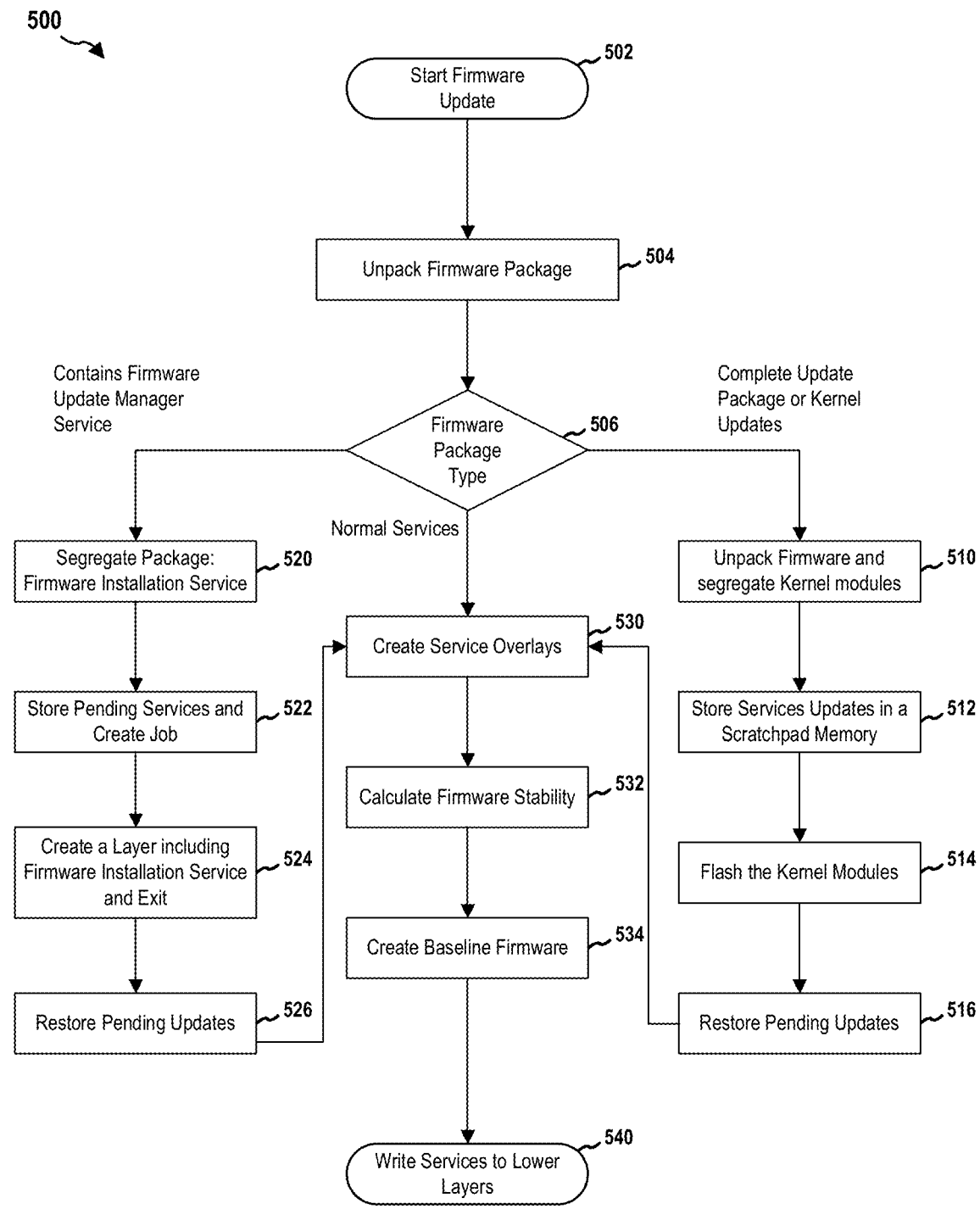
FIG. 5 is a diagram illustrating data flows of firmware updates in accordance with the second technique.

FIG. 5 is a diagram 500 illustrating data flows of firmware updates in accordance with the second technique. At operation 502, the firmware installation interface 138 receives firmware update packages. At operation 504, the firmware installation interface 138 sends the firmware update packages to the firmware installation service 136. The firmware installation service 136 unpacks the firmware update packages. At operation 506, the firmware installation service 136 checks the content of the firmware update packages and determines the type of the update.

Within the operation 506, when the firmware update packages contain updates to the initial kernel 442, the initial drivers 446, or other kernel modules, the firmware installation service 136 determines a complete update needs to be performed and enters operation 510.

At operation 510, the firmware installation service 136 segregates the kernel modules (e.g., the updated kernel or drivers) from the other services updates (e.g., updated libraries 464, updated services 134-1', 134-2'). At operation 512, the firmware installation service 136 stores the other services updates in a scratchpad memory as pending updates. At operation 514, the firmware installation service 136 flashes the part of the RIO partition storing the lower-2 layer 440 with an updated lower-2 layer 440 having the updated kernel 442 and the updated drivers 446. The initial lower-2 layer 440 may be stored in the non-volatile storage 142 to revert to if needed. The BMC 102 then reboots and loads the updated kernel 442 and the updated drivers 446.

At operation 516, the firmware installation service 136 starts on top of the updated kernel 442 and the updated drivers 446. The firmware installation service 136 locates the stored pending updates for the other service components. The firmware installation service 136 then enters operation 530.

Within the operation 506, when the firmware update packages do not contain updates to the initial kernel 442, the initial drivers 446, or other kernel modules, the firmware installation service 136 then determines whether the firmware update packages contain an update to the firmware installation service 136 itself. When the firmware update packages contain an update to the firmware installation service 136, the firmware installation service 136 enters operation 520. Otherwise, the firmware installation service 136 enters operation 530.

At operation 520, the firmware installation service 136 segregates the update to the firmware installation service 136 in the firmware update packages from the updates to other service components. At operation 522, the firmware installation service 136 stores the updates to other service components, for example, in the non-volatile storage 142 and creates pending jobs for the firmware installation service 136 to execute those updates.

At operation 524, the firmware installation service 136 creates new layer on top of the lower-1 layer 450 that contains the updated firmware installation service 136. The running firmware installation service 136 then exits and shuts down its process. At operation 526, the updated firmware installation service 136 starts and locates the stored pending jobs regarding the other service components. In this example, the other service components include the updated libraries 464 and the updated services 134-1', 134-2'. Then the firmware installation service 136 enters operation 530.

At operation 530, the firmware installation service 136 creates an upper layer 460 containing the updated libraries 464 and the updated services 134-1', 134-2'. The firmware installation service 136 stores the upper layer 460 in, for example, the non-volatile storage 142. The BMC 102 then reboots, and the overlay file system 452 provides an overlay layer 470 that combines the layers below. The BMC 102 loads the updated services 134-1', 134-2'. As such, the updated services 134-1', 134-2' are running on the BMC 102.

Figure 6:
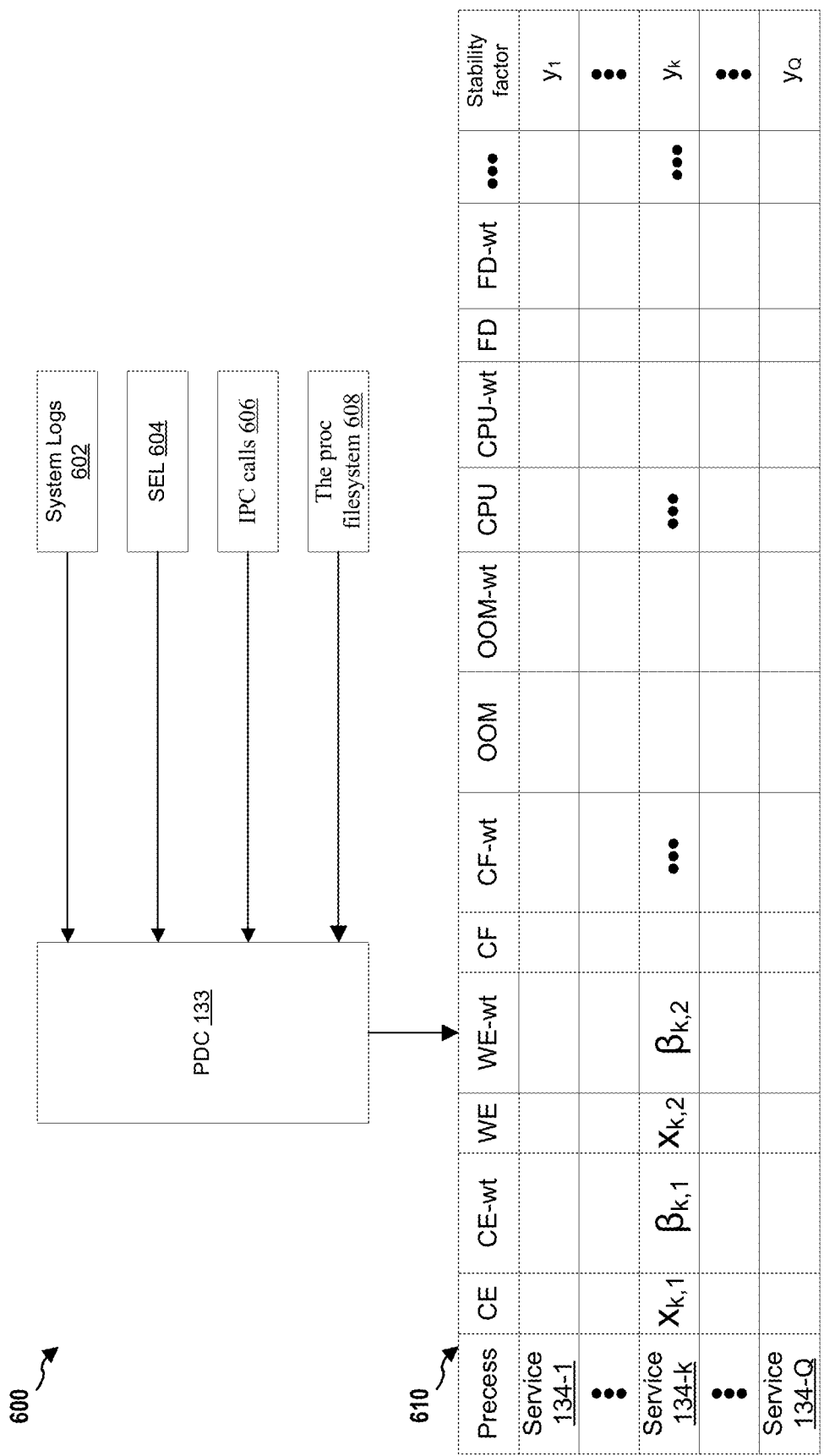
FIG. 6 is a diagram illustrating techniques of calculating a stability factor (or index).

At operation 532, as described infra with reference to FIG. 6, the PDC 133 determines the updated services 134-1', 134-2' are updated services and, accordingly, calculates stability factors $y_{1,m+1}$ and $y_{2,m+1}$ for a $(m+1)^{th}$ time period after the updates are installed. Previously, the PDC 133 also calculated $y_{1,m}$ and $y_{2,m}$ for an $m^{th}$ time period prior to the update. The management component 131 may compare the current stability factor of each service with the prior stability factor of that service to determine whether the updated service is more stable. Alternatively, the PDC 133 may calculate a firmware total stability factor $Y_{m+1}$, which is then compared with the prior total stability factor $Y_m$ to determine whether the updated firmware is more stable as a whole.

When the updated firmware is less stable than the previous version, the management component 131 may decide to revert to the previous version. Accordingly, the overlay file system 452 may remove the upper layer 460 that includes the updated services 134-1', 134-2'. Subsequently, the firmware installation interface 138 may receive another firmware update packages including updated services 134-1\*, 134-2\*. Similarly, the firmware installation service 136 can create another upper layer 460\* containing the updated services 134-1\*, 134-2\*. The BMC 102 reboots and runs the updated services 134-1\*, 134-2\*. The PDC 133 similarly calculates the stability factors of the two updated services in a $(m+2)^{th}$ time period after the second update.

In the example, the management component 131 determines that the updated services 134-1\*, 134-2\* are not less stable than the previous version. At operation 534, the management component 131 determines that the current version of the firmware may be used as baseline firmware.

At operation 540, when the lower-1 layer 450 and the lower-2 layer 440 are stored in the R/W partition, the overlay file system 452 may move the components on the upper layer 460\* and other upper layers to the lower-1 layer 450 or the lower-2 layer 440 and then remove the upper layers. That is, the overlay file system 452 creates updated lower-1 layer 450 and updated lower-2 layer 440. When the lower-1 layer 450 and the lower-2 layer 440 are stored in the R/O partition, the firmware installation service 136 may flash the R/O partition with the updated lower-1 layer 450 and lower-2 layer 440.

FIG. 6 is a diagram 600 illustrating techniques of calculating a stability factor (or index). The management component 131 can monitor operations of the services 134-1 to 134-Q and use N parameters to record operation status of the services 134-1 to 134-Q. The N parameters include: (a) CE for number of critical events per service; (b) WE for number of warning events per service; (c) CF for core files per service; (d) OOM for out of memory issues per service; (e) CPU for service restarts based on high CPU usage; and (f) FD for inter-process communication (IPC) and file descriptor (FD) leaks per service, etc.

The PDC 133 collects data of the services 134-1 to 134-Q and determines values for the parameters based on the collected data for a stipulated amount of time (e.g., an hour, a day, a week, etc.). The data can be collected from different system logs 602, system event logs (SEL) 604, IPC calls 606, the proc filesystem 608, etc. Further, the PDC 133 can assign a weight to each of the parameters and create a time series data table 610.

For the $k^{th}$ service (e.g., the service 134-*k*) running on the BMC 102, the PDC 133 can generate a stability factor based on the below multivariate regression model:

$$y_k = \beta_{k,0} + \beta_{k,1} \cdot x_{k,1} + \beta_{k,2} \cdot x_{k,2} + \ldots + \beta_{k,n} \cdot x_{k,n} + \ldots + \beta_{k,N} \cdot x_{k,N}, k \in (1,Q),$$

where $y_k$ is the stability factor of the $k^{th}$ service, $x_{k,n}$ is observed value for the $n^{th}$ parameter, and $\beta_{k,n}$ is the coefficient or weight associated with the $n^{th}$ parameter. $n \in (1,N)$. $\beta_{k,0}$ is a base factor. The lower the service stability factor is, the more stable the service is.

The firmware total stability is calculated over a stipulated amount of time and the BMC 102 can generate a firmware stability time series information. The firmware stability $Y_m$ for the $m^{th}$ time period is a function of the stability factors of all services 134-1 to 134-Q in that time period. For example, $Y_m$ may be an average of the stability factors of all services as follows:

$$Y_m = \frac{\sum_1^Q y_{k,m}}{Q},$$

where $y_{k,m}$ is $y_k$ is the stability factor of the $k^{th}$ service in the $m^{th}$ time period.

If a firmware update only includes updates to particular service, then after the update is installed, only stability factor for that service needs to be calculated. Other services have no changes and their stability factors remain the same. The BMC 102 or other management service can correlate $Y_m$ with the version of services running in the $m^{th}$ time period.

When a service update happens, the PDC starts collecting information from the new services. The new firmware total stability factor $Y_{m+1}$ calculated and compared with the previous stability factor data $Y_m$. The data is collected across similar time expanse and the data is compared.

The PDC 133 can also be extended to calculate service performance data. Each service may provide to the PDC 133 throughput information that may be correlated with the CPU and memory load (systemd-cgtop). The performance data along with the previously calculated stability factor may be used for controlling overlay services.

The services at different layer have their own performance data and stability factor. The lowest layer contains the stable services. If the new updated services perform poorly, another overlay may be provided with updates or fixes. Such layers will be created till we have a better stability factor and equivalent or better performance data. The services thus will be moved to the lowest layer and will become the base version. The layers may be unmounted after the services are baselined. The lower layer components are thus protected and the system stability ensured.

Figure 7:
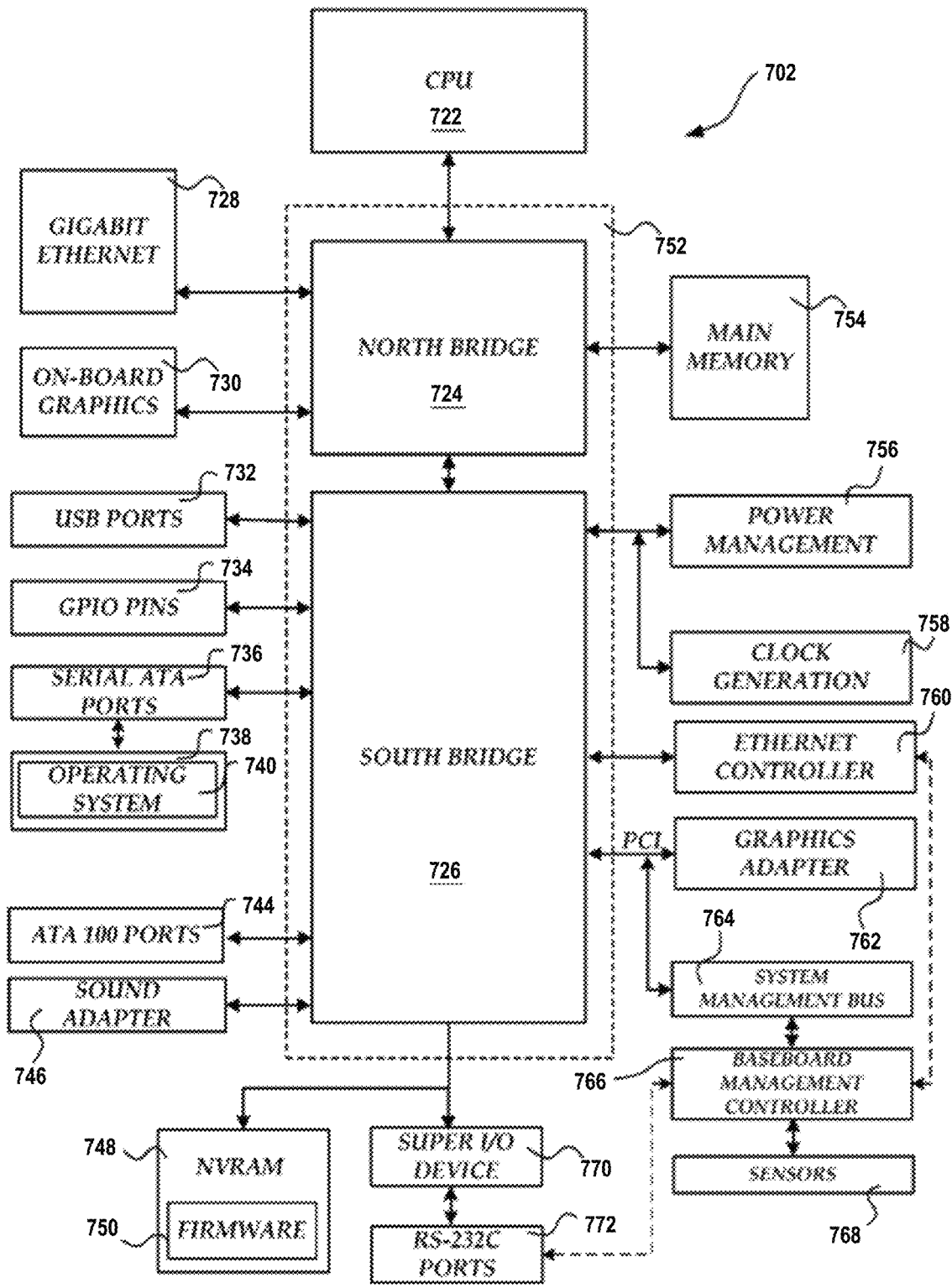
FIG. 7 shows a computer architecture for a computer.

FIG. 7 and the following discussion are intended to provide a brief, general description of one suitable computing environment in which aspects of the embodiments described herein may be implemented. In particular, FIG. 7 shows a computer architecture for a computer 702 that may be utilized to embody the host computer 180, as described supra. It should be appreciated that the computer architecture shown in FIG. 7 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 702 shown in FIG. 7 includes a baseboard, or "motherboard," which is a printed circuit board to which a multitude of components or devices may be connected by way of a system bus or other electrical communication path. In one illustrative embodiment, a CPU 722 operates in conjunction with a chipset 752. The CPU 722 is a standard central processor that performs arithmetic and logical operations necessary for the operation of the computer. The server computer 702 may include a multitude of CPUs 722.

The chipset 752 includes a north bridge 724 and a south bridge 726. The north bridge 724 provides an interface between the CPU 722 and the remainder of the computer 702. The north bridge 724 also provides an interface to a random access memory ("RAM") used as the main memory 554 in the computer 702 and, possibly, to an on-board graphics adapter 730. The north bridge 724 may also include functionality for providing networking functionality through a gigabit Ethernet adapter 728. The gigabit Ethernet adapter 728 is capable of connecting the computer 702 to another computer via a network. Connections which may be made by the network adapter 728 may include LAN or WAN connections. LAN and WAN networking environments are commonplace in offices, enterprise-wide computer networks, intranets, and the internet. The north bridge 724 is connected to the south bridge 726.

The south bridge 726 is responsible for controlling many of the input/output functions of the computer 702. In particular, the south bridge 726 may provide one or more USB ports 732, a sound adapter 746, an Ethernet controller 760, and one or more GPIO pins 734. The south bridge 726 may also provide a bus for interfacing peripheral card devices such as a graphics adapter 762. In one embodiment, the bus comprises a PCI bus. The south bridge 726 may also provide a system management bus 764 for use in managing the various components of the computer 702. Additional details regarding the operation of the system management bus 764 and its connected components are provided below.

The south bridge 726 is also operative to provide one or more interfaces for connecting mass storage devices to the computer 702. For instance, according to an embodiment, the south bridge 726 includes a serial advanced technology attachment ("SATA") adapter for providing one or more SATA ports 736 and an ATA 100 adapter for providing one or more ATA 100 ports 744. The SATA ports 736 and the ATA 100 ports 744 may be, in turn, connected to one or more mass storage devices such as the SATA disk drive 738 storing an operating system 740 and application programs. As known to those skilled in the art, an operating system 740 comprises a set of programs that control operations of a computer and allocation of resources. An application program is software that runs on top of the operating system software, or other runtime environment, and uses computer resources to perform application specific tasks desired by the user. According to one embodiment of the invention, the operating system 740 comprises the LINUX operating system. According to another embodiment of the invention the operating system 740 comprises an operating system within the WINDOWS family of operating systems from MICROSOFT CORPORATION. According to another embodiment, the operating system 740 comprises the UNIX, LINUX, or SOLARIS operating system. It should be appreciated that other operating systems may also be utilized.

The mass storage devices connected to the south bridge 726, and their associated computer storage media, provide non-volatile storage for the computer 702. Although the description of computer storage media contained herein refers to a mass storage device, such as a hard disk or CD-ROM drive, it should be appreciated by those skilled in the art that computer storage media can be any available media that can be accessed by the computer 702.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 726 for connecting a "Super I/O" device 770. The Super I/O device 770 is responsible for providing a number of input/output ports, including a keyboard port, a mouse port, a serial interface 772, a parallel port, and other types of input/output ports. The LPC interface may also connect a computer storage media such as a ROM or a flash memory such as a NVRAM 748 for storing the firmware 750 that includes program code containing the basic routines that help to start up the computer 702 and to transfer information between elements within the computer 702.

As described briefly above, the south bridge 726 may include a system management bus 764. The system management bus 764 may include a BMC 766. The BMC 766 may be the BMC 102. In general, the BMC 766 is a microcontroller that monitors operation of the computer system 702. In a more specific embodiment, the BMC 766 monitors health-related aspects associated with the computer system 702, such as, but not limited to, the temperature of one or more components of the computer system 702, speed of rotational components (e.g., spindle motor, CPU Fan, etc.) within the system, the voltage across or applied to one or more components within the system 702, and the available or used capacity of memory devices within the system 702. To accomplish these monitoring functions, the BMC 766 is communicatively connected to one or more components by way of the management bus 764. In an embodiment, these components include sensor devices 768 for measuring various operating and performance-related parameters within the computer system 702. The sensor devices 768 may be either hardware or software based components configured or programmed to measure or detect one or more of the various operating and performance-related parameters.

It should also be appreciated that the computer 702 may comprise other types of computing devices, including handheld computers, embedded computer systems, personal digital assistants, and other types of computing devices known to those skilled in the art. It is also contemplated that the computer 702 may not include all of the components shown in FIG. 7, may include other components that are not explicitly shown in FIG. 7, or may utilize an architecture completely different than that shown in FIG. 7.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of updating firmware in a baseboard management controller (BMC), comprising:
    receiving, at the BMC, an update package containing one or more updated software components of a firmware image of the BMC to replace corresponding existing software components running on the BMC;
    shutting down the corresponding existing software components running on the BMC and executing the one or more updated software components of the firmware image of the BMC;
    calculating one or more first stability factors of the one or more updated software components of the firmware image of the BMC;
    comparing the one or more first stability factors of the one or more updated software components of the firmware image of the BMC with one or more second stability factors of the corresponding existing software components running on the BMC;
    determining whether to keep the one or more updated software components of the firmware image of the BMC based on the comparison result; and
    when the comparison result indicates that the one or more updated software components of the firmware image of the BMC are not less stable than the corresponding existing software components running on the BMC, removing the corresponding existing software components running on the BMC from the BMC.

2. The method of claim 1, wherein a stability factor of a service is a function of a set of parameters specifying an operation of the service.

3. The method of claim 2, wherein the set of parameters include at least one of:
    (a) a number of critical events per service;
    (b) a number of warning events per service;
    (c) a number of core files per service;
    (d) a number of out of memory issues per service;
    (e) a number of service restarts based on high central processing unit (CPU) usage; and
    (f) a number of inter-process communication (IPC) and file descriptor (FD) leaks per service.

4. The method of claim 2, further comprising:
    assigning a set of weights to the set of parameters, wherein the function of the set of parameters is a weighted sum of the set of parameters according to the set of weights.

5. The method of claim 1, further comprising:
    when the comparison result indicates that the one or more updated software components of the firmware image of the BMC are less stable than the corresponding existing software components running on the BMC:
    shutting down the one or more updated software components of the firmware image of the BMC and removing the one or more updated software components of the firmware image of the BMC; and
    obtaining the corresponding existing software components running on the BMC and re-executing the corresponding existing software components running on the BMC.

6. The method of claim 1, wherein an upper layer of an overlay file system contains the one or more updated software components of the firmware image of the BMC, the method further comprising:
    moving the one or more updated software components of the firmware image of the BMC from the upper layer of the overlay file system to a lower layer of the overlay file system; and
    removing the upper layer of the overlay file system from the overlay file system.

7. The method of claim 6, further comprising:
    creating a baseline firmware including the one or more updated software components of the firmware image of the BMC.

8. An apparatus, the apparatus being a baseboard management controller (BMC), comprising:
a memory; and
at least one processor coupled to the memory and configured to:
receive, at the BMC, an update package containing one or more updated software components of a firmware image of the BMC to replace corresponding existing software components running on the BMC;
shut down the corresponding existing software components running on the BMC and execute the one or more updated software components of the firmware image of the BMC;
calculate one or more first stability factors of the one or more updated software components of the firmware image of the BMC;
compare the one or more first stability factors of the one or more updated software components of the firmware image of the BMC with one or more second stability factors of the corresponding existing software components running on the BMC;
determine whether to keep the one or more updated software components of the firmware image of the BMC based on the comparison result; and
when the comparison result indicates that the one or more updated software components of the firmware image of the BMC are not less stable than the corresponding existing software components running on the BMC, remove the corresponding existing software components running on the BMC from the BMC.

9. The apparatus of claim 8, wherein a stability factor of a service is a function of a set of parameters specifying an operation of the service.

10. The apparatus of claim 9, wherein the set of parameters include at least one of:
(a) a number of critical events per service;
(b) a number of warning events per service;
(c) a number of core files per service;
(d) a number of out of memory issues per service;
(e) a number of service restarts based on high central processing unit (CPU) usage; and
(f) a number of inter-process communication (IPC) and file descriptor (FD) leaks per service.

11. The apparatus of claim 9, wherein the at least one processor is further configured to:
assign a set of weights to the set of parameters, wherein the function of the set of parameters is a weighted sum of the set of parameters according to the set of weights.

12. The apparatus of claim 8, wherein the at least one processor is further configured to:
when the comparison result indicates that the one or more updated software components of the firmware image of the BMC are less stable than the corresponding existing software components running on the BMC:
shut down the one or more updated software components of the firmware image of the BMC and remove the one or more updated software components of the firmware image of the BMC; and
obtain the corresponding existing software components running on the BMC and re-execute the corresponding existing software components running on the BMC.

13. The apparatus of claim 8, wherein an upper layer of an overlay file system contains the one or more updated software components of the firmware image of the BMC, and wherein the at least one processor is further configured to:
move the one or more updated software components of the firmware image of the BMC from the upper layer of the overlay file system to a lower layer of the overlay file system; and
remove the upper layer of the overlay file system from the overlay file system.

14. The apparatus of claim 13, wherein the at least one processor is further configured to:
create a baseline firmware including the one or more updated software components of the firmware image of the BMC.

15. A non-transitory computer-readable medium storing computer executable code for updating firmware in a baseboard management controller (BMC), comprising code configured to:
receive, at the BMC, an update package containing one or more updated software components of a firmware image of the BMC to replace corresponding existing software components running on the BMC;
shut down the corresponding existing software components running on the BMC and execute the one or more updated software components of the firmware image of the BMC;
calculate one or more first stability factors of the one or more updated software components of the firmware image of the BMC;
compare the one or more first stability factors of the one or more updated software components of the firmware image of the BMC with one or more second stability factors of the corresponding existing software components running on the BMC;
determine whether to keep the one or more updated software components of the firmware image of the BMC based on the comparison result; and
when the comparison result indicates that the one or more updated software components of the firmware image of the BMC are not less stable than the corresponding existing software components running on the BMC, remove the corresponding existing software components running on the BMC from the BMC.

16. The non-transitory computer-readable medium of claim 15, wherein a stability factor of a service is a function of a set of parameters specifying an operation of the service.

17. The non-transitory computer-readable medium of claim 16, wherein the set of parameters include at least one of:
(a) a number of critical events per service;
(b) a number of warning events per service;
(c) a number of core files per service;
(d) a number of out of memory issues per service;
(e) a number of service restarts based on high central processing unit (CPU) usage; and
(f) a number of inter-process communication (IPC) and file descriptor (FD) leaks per service.

18. The non-transitory computer-readable medium of claim 16, wherein the code is further configured to:
assign a set of weights to the set of parameters, wherein the function of the set of parameters is a weighted sum of the set of parameters according to the set of weights.

* * * * *